United States Patent [19]
Bielfeldt et al.

[11] 3,843,294
[45] Oct. 22, 1974

[54] INJECTION SYSTEM FOR GANGED INJECTION MOLDS

[75] Inventors: Friedrich Bernd Bielfeldt, Aidenried; Artur Kamm, Eichstatt, both of Germany

[73] Assignee: Krauss-Maffei AG, Munich, Germany

[22] Filed: Sept. 15, 1972

[21] Appl. No.: 289,222

[30] Foreign Application Priority Data
Sept. 15, 1971 Germany............................ 2146212
Aug. 26, 1972 Germany............................ 2242017

[52] U.S. Cl.. 425/247, 425/DIG. 51, 425/DIG. 227, 425/250
[51] Int. Cl............................................. B29f 1/03
[58] Field of Search ........... 425/250, 247, 234, 242, 425/DIG. 227, 338, DIG. 51

[56] References Cited
UNITED STATES PATENTS
2,992,455  7/1961  Salzman.......................... 425/247 X
3,068,522  12/1962  Nickerson et al............... 425/250 X
3,533,137  10/1970  Michelson........................... 425/242
3,632,248  1/1972  Reinfeld........................... 425/247 X
3,647,338  3/1972  Ise..................................... 425/247

FOREIGN PATENTS OR APPLICATIONS
45-40428  12/1970  Japan................................. 425/250

*Primary Examiner*—Robert D. Baldwin
*Assistant Examiner*—David S. Safran
*Attorney, Agent, or Firm*—Karl F. Ross; Herbert Dubno

[57] ABSTRACT

A system for injecting synthetic-resin material into an injection-molding assembly having ganged mold cavities, i.e., a multiple-separation mold in which the mold chambers to be charged are located one behind or above another in the mold-opening or mold-closing direction, wherein the mold-charging duct is so constructed and arranged that, from the outlet of the duct, the injectable material flows along equal-length paths to all of the chambers.

17 Claims, 4 Drawing Figures

INJECTION SYSTEM FOR GANGED INJECTION MOLDS

FIELD OF THE INVENTION

Our present invention relates to a system for the injection molding of synthetic-resin materials including thermoplastics, elastomeric and rubbers, and thermohardening or settable (chemically or thermally crosslinking) substances and, more particularly, to an injection-molding apparatus or installation using multiple-separation molds.

BACKGROUND OF THE INVENTION

In the process of injection molding, a generally plasticized, plastified, masticated or liquid flowable composition of a synthetic resin, elastomer or other hardenable or settable material, is generally injected under elevated pressure into a mold cavity formed between a pair of mold members which may be opened to discharge the molded product after the latter has hardened, cured or set. It is known in such systems to provide multiple-separation molds wherein the mold assembly may consist of three or more relatively movable mold members defining two or more mold cavities or chargeable compartments and in which the separation or partition planes of the mold members lie generally parallel to one another, i.e. one behind the other or one above another.

Various systems have been proposed for injecting the synthetic resin or elastomer composition into those molds and these systems generally comprise an injection-nozzle arrangement communicating with the mold compartments for forcing the composition into the latter. In one arrangement, the separation planes lie one above another vertically and an injection nozzle arangement opens from the bottom, from the top or from the side, but preferably is provided with a charging duct, conduit or passage which extends perpendicularly to the separation planes between the compartments and a masticating or other device in the injection head for preparing the injectable composition. The mold cavities or compartments of a single mold cavity are thus charged with the hardenable, settable or curable composition in succession, i.e., one after the other, such that the first mold cavity is fully charged and thereafter the charge passes from the first mold cavity into the next. Such systems are primarily used for the injection molding of elastomer or rubber compositions.

When synthetic resins (e.g., thermoplastic or thermosetting resins) are to be injected into a multiple-separation mold assembly having parallel separating planes between the mold members, the mold cavities are generally disposed one behind the other in the horizontal direction and the passage opens horizontally into the mold cavity. The injection-nozzle arrangement thus may comprise a distribution nozzle passing centrally through the assembly and charging the mold cavities individually and consecutively.

Both the apparatus and the several processes described above have the disadvantage that the injectable compositions (elastomer or synthetic resin) may be influenced adversely along their injection paths to entry into the respective mold cavities. In other words, the injectable compositions can be subjected to variations and extremes of heat and pressure, can be compositionally affected because of increased or decreased mixing or working and may otherwise be treated or subjected to variation and uncontrollable conditions which modify the physical and/or chemical properties of the resin upon injection and/or have deleterious effects upon the product.

OBJECTS OF THE INVENTION

It is the principal object of the present invention to provide an improved system for the charging of a multiseparating mold whereby the aforedescribed disadvantages are obviated or reduced and reproducibility in the injection molding of bodies is increased.

Another object of the invention is to provide a system for producing homogeneous and reproducible bodies of high quality and at low cost and multiseparation molds heretofore affected adversely by different influences upon the composition entering the different mold cavities and/or mold compartments.

SUMMARY OF THE INVENTION

These objects and others which will become apparent hereinafter are attained, in accordance with the present invention, with a distribution nozzle arrangement for an injection-molding system of the character generally described whereby the injection duct or passage opens laterally at intervals into the mold cavity and the duct is constructed and arranged so that the injectable composition traverses paths of substantially equal length from a discharge end of the passage to the respective mold cavities or compartments.

More particularly, the main nozzle passage is provided with distributor-nozzle lateral passages which extend over equal lengths from a common point at which the injectable composition splits or is deflected (branched) along respective paths. The term "multiple-separation mold" is used herein exclusively to refer to a mold arrangement having one or more mold cavities with at least two independently chargeable compartments defined between at least three mold members with at least two separation planes between them, the separation planes being generally parallel to one another and perpendicular to the plane of the main feed passage. Furthermore, an apparatus embodying this mold member may include, in addition to the usual mold-closing means, means for increasing the pressure holding the mold section together during the injection stroke at which time the pressure within the mold cavity rises to its maximum level. The mold-closing arrangement is thus provided with injection-mold cavities and a distribution nozzle which extends in the mold-closing direction and may even be located centrally of the mold cavities, i.e., may have mold cavities disposed on opposite sides of a centrally extending nozzle passage. The nozzle arrangement thus may extend through the movable mold members and/or any mold-carrying plates, the latter being part of the mold-closing means.

According to a more specific feature of the invention, therefore, the mold-closing means may comprise a multiplicity of mold-carrying plates which are shiftable toward and away from one another during the mold-closing and mold-opening operations in a direction perpendicular to the separating planes of the molds, the mold-carrying plates each being provided with a mold half juxtaposed with the other mold half of the respective mold so that a plurality of molds are thereby constituted.

The distributing nozzle, which is formed as a tube extending centrally through the mold-carrying plates and the mold halves mounted thereon, thus may extend through the mold halves in the direction of displacement thereof during the mold-closing and mold-opening operations. The distributing nozzle may be mounted on the injection head of the machine and may be fixed relative to the mold-carrying plates or may be movable with the injection head where desirable. The injection head may be mounted upon a masticator or other device for preparing the injectable material and a chamber containing the injectable material which may be pressurized by ram or fluid pressure to drive the injectable material into the mold cavities.

According to another feature of the invention, each of at least two molds has a generally conical seat converging in the direction of the axis of the distributor nozzle (away from the injection head) and sealingly engageable with a respective mating complementary frustoconical surface of the distributor nozzle in the closed position of the molds. A fluid-tight seal is thus provided around the distributor nozzle so that when the mold is opened, and residue of the injectable material can be broken away from the nozzle and a clean discharge during the subsequent injection cycle ensured. The sealing arrangement, moreover, prevents seepage of the injectable material around the distributor nozzle.

We have found it to be important to constitute each mold of a pair of mold halves, each carried by a respective mold-support or carrier plate of the mold-closing mechanism such that each pair of mold halves defines a respective mold cavity between them. Each of the mold halves then has a conical recess forming a portion of the respective conical seat and sealingly engageable with part of the associated frustoconical surface of the distributor nozzle in the closed position of the molds.

The juxtaposed mold halves of each mold are provided with confronting and registering grooves leading to the mold cavity and defining, in the closed position of the mold, feed channels for delivering the injectable material to the cavity. The conical seat portions are, according to yet another feature formed upon respective sprue bushings or sleeves received with limited axial play or lost motion, in the mold-closing direction, in cylindrical bores of the mold halves. The two sprue bushings or pair of sprue bushings of each mold define, in the closed condition of the latter, sprue channels in communication with the feed channels. The sprue channels are, like the feed channels, formed by registering grooves (preferably of semi-circular corss-section) formed in the confronting faces of the sprue bushings.

The sprue bushings of each mold have confronting faces (in which the last-mentioned grooves are formed) which abut sealingly, in the closed position of the mold, along the respective mold-separation plane. Each sprue bushing is cylindrical and of stepped diameter to define an annular large-diameter step received between a pair of surfaces of the respective mold half and the mold-carrying plate upon which the mold half is mounted. These surfaces are spaced apart by a distance greater than the axial length of the large-diameter step, thereby permitting relative axial movement of the bushing and mold-carrying plate in the mold-closing direction.

According to yet a further feature of the invention, the sprue bushing furthest removed or most distal from the injection head of the machine is provided with a hydraulic pressurizer (counterpressure device) to maintain the axial force upon this bushing necessary to resist separation of it from its confronting bushing and also to resist withdrawal of the most-distal bushing from the frustocone of the distributor nozzle.

The distributor nozzle, with respect to which the mold-carrying plates and mold halves carried thereby are relatively movable, is provided with a main-feed passage extending axially and centrally through the distributor nozzle. In addition, the distributor nozzle itself is formed with lateral feed passages communicating between the main-feed passage and the aforementioned sprue channels. The lateral feed passages branch from a common discharge location of the main feed passage and are of equal length between the branch point and the respective sprue channels in spite of the fact that they charge different molds. The branch point thus preferably lies between two molds to be charged with the injectable material, one of the lateral feed passages continuing forwardly to one mold while the other lateral feed passage returns in the opposite direction to the other mold cavity.

It has also been found to be advantageous to provide the counterpressure device for the most distal bushing with a plunger-type pressure generator, operated by closure of the mold, e.g. by displacement of the plunger between a pair of mold-closing plates, a force-storing means (e.g., a spring) being provided between the bushing and the hydraulic actuator therefor.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
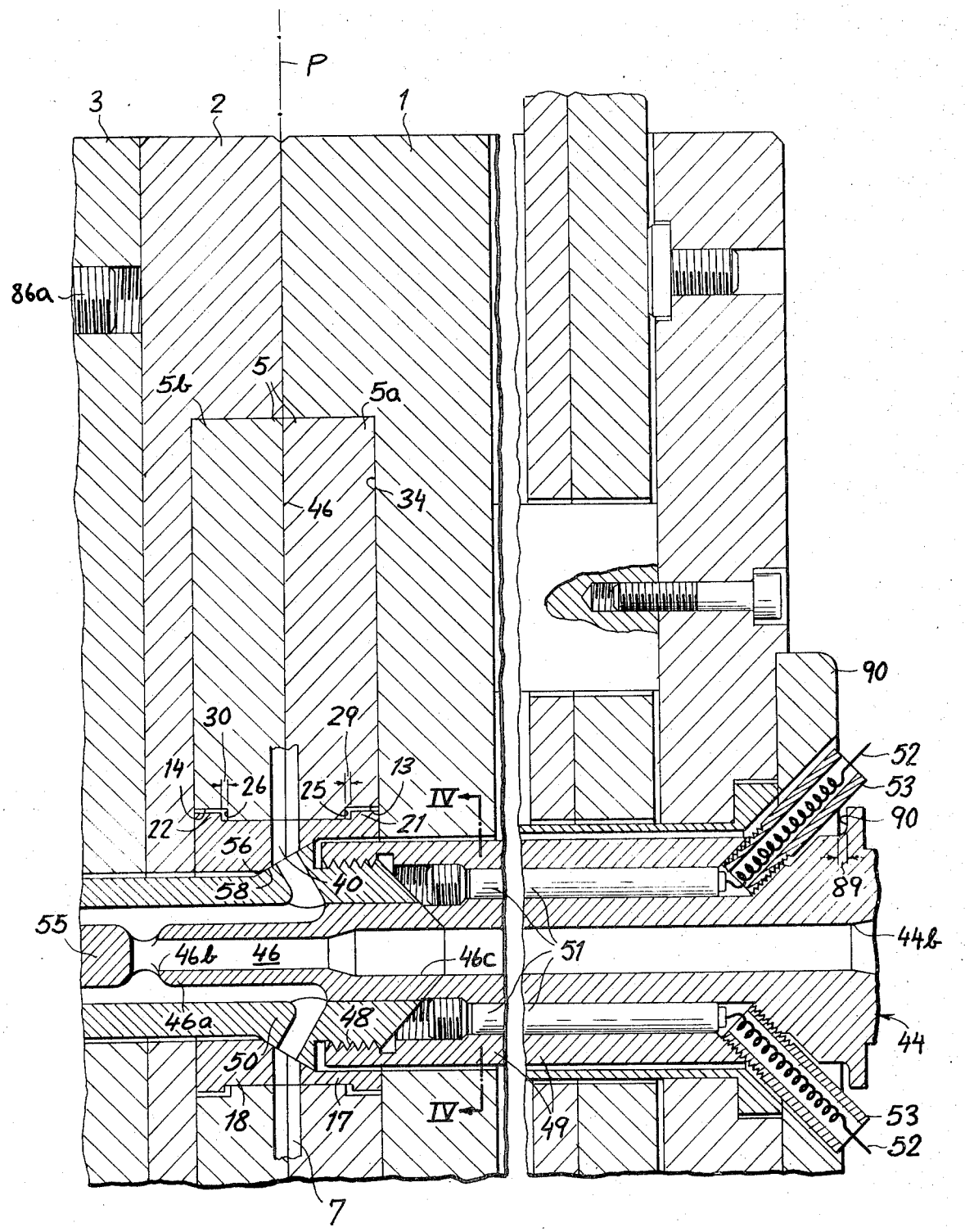
FIG. 1 is an axial cross-sectional view through a multiple mold assembly according to the present invention, parts which are not critical to an understanding of the structure of the invention being omitted.
Figure 2:
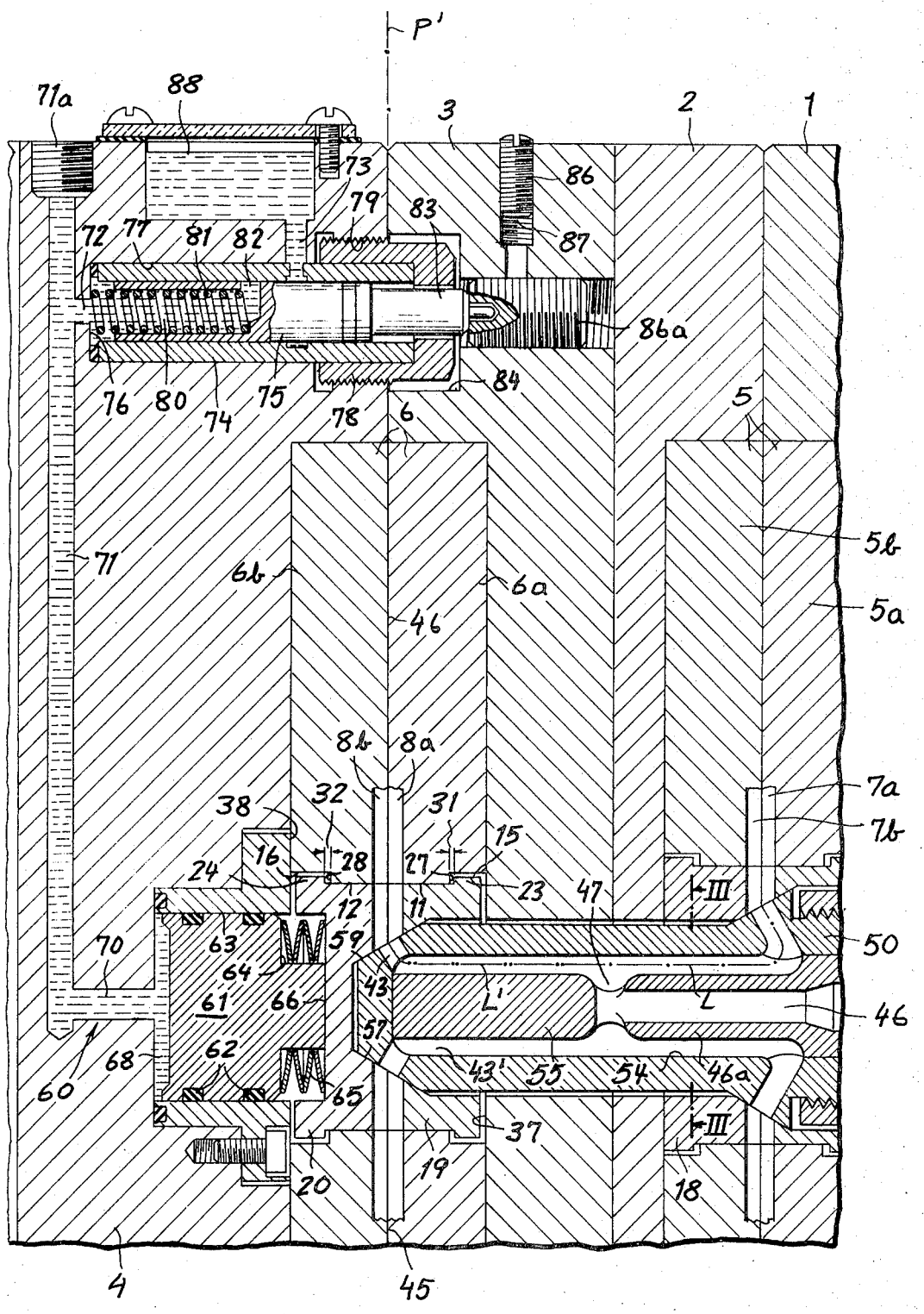
FIG. 2 is a view similar to FIG. 1 and overlapping same.

In the drawing we have shown a mold assembly which comprises the platens 1, 2, 3 and 4 forming mold-carrying members of a mold-closing arrangement not further illustrated but using hydraulic means or the like to shift the molds apart or together. The system has been illustrated for a double-mold arrangement in which molds 5 and 6 are respectively carried by the plates 1, 2 and 3, 4, the molds 5 and 6 each consisting of a mold half 5a and 5b or 6a and 6b respectively mounted in the plates 1 and 2 or the plates 3 and 4. In FIGS. 1 and 2 of the drawing, the molds are shown to be in their closed position and separation of the molds along the mold-separating planes P and P' (parallel to and disposed one behind the other) serves to open the mold and allow the finished product to be withdrawn. The mold-closing means may also include a system for increasing the mold-closing pressure to retain the mold halves in a tightly locked position during charging (injection) of the material into the mold.

Each of the molds 5 and 6 is provided with respective mold cavities and sprues or channels 7, 8 leading to these mold cavities which have not been illustrated. The channels 7 and 8, of course, are designed to conduct the injectable material to the respective mold cavities, and hardened residue in the channels being removed with the product when the mold is opened. To this end each of the channels is formed by a pair of grooves 7a and 7b or 8a and 8b registering with and open toward the other, while being of a cross-section converging away from the separating plane P or P'. This facilitates removal of the hardened material from the mold cavity and the channels.

The feed channels 7 and 8 terminate and extend radially from respective bores 9, 10, 11 and 12 formed in the mold members 5a, 5b, 6a and 6b, respectively; such bores have axes which coincide and are perpendicular to the planes P and P'. The bores 9 – 12 are provided with respective countersinks or larger-diameter recesses 13 – 16, respectively, the recesses 13 being turned toward the right-hand side of the apparatus from which the charge is injected. The recess 14 is turned in the opposite direction and recesses 15 and 16 are respectively turned to the right and to the left as shown in FIGS. 1 and 2.

Each of the bores 9 – 12 with the corresponding recesses 13 – 16 receives a respective axially shiftable stepped cylindrical sprue bushing or sleeve 17 – 20. The stepped configuration of the sprue bushings thus provides a holder 21 – 24, respectively, on each bushing engageable with shoulders 25 – 28 of the recesses 13 – 16 with clearances or lost motion in the axial direction represented by the distances 29 – 31. In other words, each of the sprue bushings 17 – 20 is received between the respective mold plate 5a, 5b, 6a and 6b and the mold-carrying plate 1 – 4 with a lost motion or play in the axial direction, of the dimensions 29 – 31.

The shoulders 21 and 22 thus may, in the closed position of the mold, abut the outer surfaces 33 and 34 of the mold-carrying plates 1 and 2 while the end faces of shoulders 23 and 24 are set back, at least in the injection position, with respect to the outer surfaces 37 and 38 of the mold-carrying plates 3 and 4.

In the injection position of the system, moreover, the sprue bushings 17 and 18 or 19 and 20 communicate between the respective feed channel 7 or 8 of the mold 5 or 6, and sprue 40 or 41, the latter being passages formed between the pairs of bushings 17 and 18 or 19 and 20. The passages 40 and 41, moreover, may open to allow the hardened synthetic resin or elastomeric material to be withdrawn as described for the corresponding feed channels 7 and 8. Sprue channels 40 and 41 open generally parallel to the planes P and P', are bisected by them and are radial with respect to the sprue bushings 17 – 20.

The sprue channels 40 and 41 communicate, in turn, with the nozzle channels 42 and 43 of a distributing nozzle 44. In the closed condition of the mold, preparatory to injection, the confronting faces of the pairs of bushing 17 and 18 or 19 and 20 engage along the parting lines 45 and 46. A sealing contact is thereby made. The channels 40 and 41 are defined between semicylindrical grooves which, when the confronting faces of the pairs of bushings 17 and 18 or 19, 20 are brought axially together, has a circular cross-section.

Figure 3:
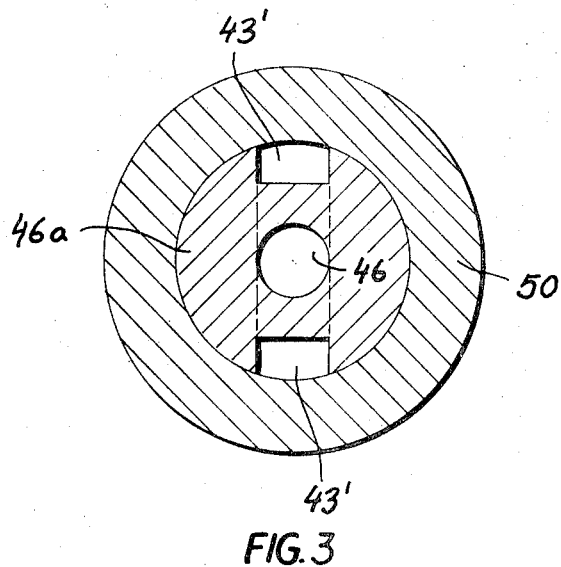
FIG. 3 is a cross-sectional view taken generally along the line III — III of FIG. 2.

The nozzle channels 42 and 43 are connected to intermediate passages 45 (FIGS. 1 – 3) of the distribution nozzle 44. The distribution nozzle 44, which may be connected at the right-hand side of the apparatus to a masticator, plastifier or other treatment device for the injection moldable material, comprises a tubular body 49 with a central bore 44b carrying the injection-moldable material. This bore is extended by the main nozzle passage 46 defined by a tube 46a of thermally conductive material as will be apparent hereinafter. The end 46b of this duct constitutes the branching or distribution point for the purposes of the invention. At the branching or distribution point, the main passage 46 of the nozzle opens into transverse passages 47 which, in turn, lead to the intermediate distribution passages 45 running to the right (dot-dash line L) to the mold 5 and running to the left (dot-dash line L') to the mold 6. Lengths L and L' to the distribution point are equal, i.e., from the common transverse passage 47, the synthetic-resin or elastomeric material traversing one branch 45, 43 to one mold, travels the same distance as the synthetic-resin or elastomeric material supplied via path 45, 42 to the other mold or mold cavity.

Figure 4:
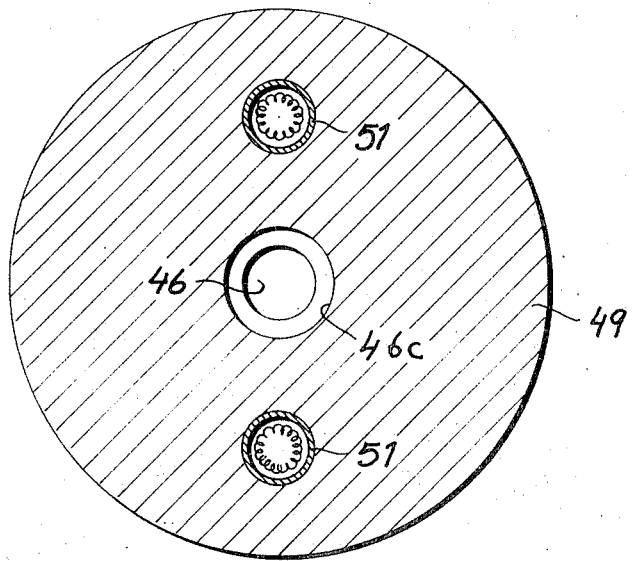
FIG. 4 is a cross-sectional view taken along the line IV — IV of FIG. 1.

The distributing nozzle 44 is preferably multipartite in order to permit thermal considerations to control the distribution of heat to the synthetic-resin or elastomeric material. To this end, the tubular body 49 is connected, at its end remote from the masticator by a screw thread 48 to the tubular body 50, the tubular bodies being coaxial one another and having frustoconical mating portions to ensure firm sealing seating between them. In one or both of these bodies, bores are provided parallel to the axis in which electric heating elements 51 (FIGS. 1 and 4) of the cartridge type are received. Electrical conductors 52, guided through sleeves 53 fitted into the appropriate bores of body 49, permit the heating elements to be connected in an appropriate circuit.

Member 50, which is provided with the frustoconical surfaces of the distribution nozzle 44 adapted to engage conical seats of the sprue bushings as noted above and described in greater detail below, is also formed directly with the nozzle outlets 42 and 43 which open outwardly and forwardly in the direction of flow of the injectable material to introduce the latter into the sprue channels 40 and 41. Furthermore, member 50 of the distributing nozzle 44 also constitutes a tube or pipe whose inner bore 54 has a larger diameter than the diameter of the bore 46 through the upstream portion of this nozzle. Within the bore 54, there is disposed a deflecting or filler member 55 of high conductivity metal which defines a passage 43' leading to the outlet 43 and forming therewith, one of the lateral feed passages 45. Member 55 is, as noted, composed of a material of high thermal conductivity and may be a copper-beryllium alloy. A further copper-beryllium alloy member may be constituted by the tube 46a whose boss 46c is pressed into member 50. Member 46 thus defines an annular space between itself and the inner wall of member 50 which constitutes the lateral feed passage level to the nozzle outlets 42. Between members 46 and 55, there is provided the transverse passage 47 which constitutes the branched point previously described and from which the lengths of the lateral passages 45 are measured.

The outer member 50 of the distributor nozzle is formed with two frustoconical surfaces 56 and 57, each of which conforms to the surface of a right circular cone and is engageable with frustoconical seats 58 and 59 formed by the sprue bushings 17 and 18 and by the sprue bushings 19 and 20 respectively. The seats 58 and 59 are each right circular cones that matingly and complementarily engage the frustocones 56 and 57 of the distribution nozzle. When the cones engage, in the mold-closing position, they seal against one another to prevent seepage around the distributor nozzle. The discharge passages 42 and 43 of the lateral passages 45 terminate at the frustoconical surfaces 56 and 57 where they register with the sprue channels 40 and 41 of the sprue bushings.

The axial mold-closing pressure also brings the seat of the sprue bushings into engagement with the frustoconical surfaces of the distributor nozzle 44. During the injection, hardening and cross-linking process, any moldable material between the sprue bushing 17 and 18 is also squeezed between them.

The pressure applied in the axial direction by the frustoconical surface 57 against the sprue bushings 19 and 20 at their frustoconical surfaces and the axial pressure developed at frustoconical surface 56 against the other sprue bushing is countered by a hydraulic means 60 including the hydraulic actuator 61. The latter is provided with piston rings 62 and is reciprocable in a cylinder 63 formed in the mold-carrying plate 4. A setback 64 of the piston is provided with dished-disk springs or a stack of Belleville washers 65 (force-storing means) abutting the rear end face of the sprue bushing 20 within a rearwardly open cup-shaped recess 66.

The face 67 of the piston turned rearwardly is pressurized by a fluid medium, e.g., hydraulic oil or other fluid, forced into the working compartment 68 between the surface 67 of piston 61 and the floor of cylinder 63.

Bore 71 is closed by a plug 71a may be used to fill the system with fluid. The duct 72 communicates with a cylinder 74 formed in the plate 4 and receiving a control or power piston 75 which opens cup-shaped, in the direction of the outlet 72. In this respect, the cylinder is similar to a conventional master cylinder of an automotive vehicle brake.

The cylinder 74 rests against a sealing disk 76 which is clamped thereby against a recess 77 in plate 4. A cap 78 is threaded into the bore 79 over the projecting end of this cylinder and is received with clearance within a recess 84 of the adjoining plate 3.

Within the interior 80 of the cylinder, there is provided a compression spring 81 which urges the control piston 75 to the right, the spring being seated at its opposite extremity upon the floor 76 of the recess 77.

A passage 80 is formed in the piston 75 and the latter carries a piston rod 83 which passes through the cap 78 and extends into the recess 84. The connecting rod is aligned with and adapted to engage a setting or abutment screw 86a which is axially aligned with the piston 75 and threaded into plate 3 while being clamped in place ty a setscrew 86 via a copper pin 87.

When the mold is opened and the plate 3 is separated from plate 2, the coil spring 81 shifts the piston 75 to the right, communicates between the passage 73 of a reservoir 88 and the interior 80 of the cylinder and relieves the pressure behind the piston 61. When the plates are closed, piston 75 is shifted to the left to block communication between the reservoir 88 and the cylinder 63.

In operation, the injection nozzle is displaced into the mold assembly and the mold is closed until the nozzle 44 is seated at surfaces 56 and 57, the cylinder pressure being generated by advance of the injection nozzle, mold closure and the development of a counterpressure in cylinder 63, the spring 65 being compressed during this operation.

The reverse mobility of the screw bushings 19 and 20 is smaller than the spacing of their shoulders 27 and 28 of the adjoining walls of the mold-carrying plate 3 and the cylinder body 63. The synthetic-resin material is then injected and passes as previously described into the mold cavities. When it is desired to move the finished bodies, the plates 1 – 4 are separated and the nozzle 44 is shifted by the hydraulic pressure developed in the injection-molding machine through a stroke 89 to the left, this stroke being determined by a pair of abutments 90 and 91 of the centering plate of the stationary mold-support plate 1 and the nozzle 44. The distance 29 between sprue bushing 17 and mold-carrying plate 18 is somewhat greater than this stroke so that the seat 56 remains pressureless. As a result, the bushings 17 and 19 are displaced slightly to the left to break away the finished product from the mold cavity. The spring 65 acts similarly upon member 20 and a further spring can be provided to shift the bushing 18 to the right, if desired. Of course, the stroke of members 2 – 4 is greater than the stroke 89.

We claim:

1. An injection arrangement for injection-molding machines and the like comprising a mold assembly including a plurality of relatively displaceable mold-carrying plates and respective mold member mounted on said plates, said mold members defining at least two molds having at least two spaced-apart parallel separation planes in closed positions of said molds, at least some of said plates being displaceable relatively in a direction perpendicular to said planes; a distributor nozzle having an axis extending perpendicular to said planes and communicating with said molds in the closed position thereof, said planes being spaced along the axis of the nozzle, said distributor nozzle being formed with a main feed passage along said axis for an injectable material adapted to charge said molds, said nozzle extending through at least some of said plates, and respective auxiliary feed passages branching from said main feed passage at least at two axially spaced locations each associated with one of said planes and leading to the respective molds, said auxiliary feed passages being of substantially equal length.

2. The arrangement defined in claim 1, further comprising respective sprue bushings on said plates communicating with the respective molds and said auxiliary feed passages, said sprue bushings being formed with conical seats, said distributor nozzle being formed with frustoconical surfaces respectively engaging said seats upon relative axial displacement of said plates and said distributor nozzle.

3. The arrangement defined in claim 2, further comprising abutment means engageable with said distributor nozzle in an open position of said molds for relieving the axial pressure of said surfaces on said seats.

4. An injection arrangement for injection-molding machines and the like comprising a mold assembly including a plurality of relatively displaceable mold-carrying plates and respective mold members mounted on said plates, said mold members defining at least two molds having parallel separation planes in closed positions of said molds, at least some of said plates being displaceable relatively in a direction perpendicular to said planes; a distributor nozzle, extending generally transversely to said planes and communicating with said molds in the closed position thereof, said distributor nozzle being formed with a main feed passage for an injectable material adapted to charge said molds, and respective auxiliary feed passages branching from said main feed passage and leading to the respective molds, said auxiliary feed passages being of substantially equal length; respective sprue bushings on said plates communicating with the respective molds and said auxiliary feed passages, said sprue bushings being formed with conical seats, said distributor nozzle being formed with frustoconical surfaces respectively engaging said seats upon relative axial displacement of said plates and said distributor nozzle, each of said mold members being provided with a bore coaxial with said distributor member and receiving a respective one of said bushings, said bushings each having a large-diameter step received with axial clearance between a pair of juxtaposed surfaces on the respective plate permitting lost motion in the axial direction of each of said sprue bushings relative to the respective plate.

5. The arrangement defined in claim 4 wherein sprue bushings of the mold members of each mold have juxtaposed faces mutually and sealingly engaging along the respective separating plane in a closed position of said plates, said faces being formed with grooves defining sprue channels communicating between the respective mold and the distributor nozzle.

6. The arrangement defined in claim 5 wherein said material is fed in one axial direction into said distributor nozzle at one end thereof, said sprue bushings including a bushing most distal from said one end, said arrangement further comprising a hydraulically actuated counterpressure element urging said most-distal sprue bushing into engagement with said distributor nozzle upon closure of the molds.

7. The arrangement defined in claim 6, further comprising force-storing means interposed between said counterpressure element and said most distal sprue bushing.

8. The arrangement defined in claim 7, further comprising a hydraulic cylinder receiving said counterpressure element, said counterpressure element constituting a piston hydraulically displaceable in said cylinder, a control cylinder communicating with the first-mentioned cylinder, a control piston displaceable in said control cylinder for displacing fluid into said first-mentioned cylinder, and means connecting said control piston to at least one of said plates for actuation of said control piston upon displacement of said plates toward one another.

9. The arrangement defined in claim 5 wherein the lost motion of the sprue bushings furthest from said end of said distributor nozzle is less than the lost motion of the other sprue bushings.

10. The arrangement defined in claim 9 wherein the lost motion of the pair of sprue bushings most removed from said end of said distributor nozzle is defined by a pair of outer surfaces, the spacing of the outer surfaces being less than the spacing of the portions of the plates engageable therewith.

11. The arrangement defined in claim 5, further comprising heating means along said distributor nozzle ahead of the branching point of said auxiliary feed passages, said auxiliary feed passages being defined at least in part by an insert of a material of high thermal conductivity received within said distributor nozzle.

12. An injection arrangement for injection-molding machines and the like comprising a mold assembly including a plurality of relatively displaceable mold-carrying plates and respective mold members mounted on said plates, said mold members defining at least two molds having parallel separation planes in closed positions of said molds, at least some of said plates being displaceable relatively in a direction perpendicular to said planes; and a distributor nozzle extending generally transversely to said planes and communicating with said molds in the closed position thereof, said distributor nozzle being formed with a main feed passage for an injectable material adapted to charge said molds, and respective auxiliary feed passages branching from said main feed passage and leading to the respective molds, said auxiliary feed passages being of substantially equal length, said auxiliary feed passages each including a transverse passage at the end of said main feed passage, a pair of oppositely directed passages parallel to said main feed passage, and discharge passages at the ends of said parallel passages, all of said passages being formed directly in said distributor nozzle.

13. The arrangement defined in claim 12 wherein said main feed passage extends centrally through said distributor nozzle and said parallel passages are located outwardly thereof.

14. The arrangement defined in claim 12 wherein said main feed passage terminates substantially midway between said molds.

15. The arrangement defined in claim 12 wherein said distributor nozzle comprises a tube extending axially through at least some of said plates, an inner duct extending spacedly within said tube and defining a clearance therearound forming said parallel passages, said central duct terminating short of the end of said tube and defining said main feed passage within said duct, and a deflecting member being received with clearance within said tube between the end thereof and said duct.

16. The arrangement defined in claim 15 wherein said deflecting member is composed of a material of high thermal conductivity.

17. The arrangement defined in claim 15 wherein said duct is composed of a material of high thermal conductivity.

\* \* \* \* \*